US009052819B2

(12) United States Patent
Kawalkar (10) Patent No.: US 9,052,819 B2
(45) Date of Patent: Jun. 9, 2015

(54) INTELLIGENT GESTURE-BASED USER'S INSTANTANEOUS INTERACTION AND TASK REQUIREMENTS RECOGNITION SYSTEM AND METHOD

(75) Inventor: Amit Nishikant Kawalkar, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 3 days.

(21) Appl. No.: 13/358,193

(22) Filed: Jan. 25, 2012

(65) Prior Publication Data
US 2013/0191790 A1 Jul. 25, 2013

(51) Int. Cl.
*G06F 3/033* (2013.01)
*G06F 3/0488* (2013.01)
*G06F 9/44* (2006.01)

(52) U.S. Cl.
CPC .......... *G06F 3/04883* (2013.01); *G06F 9/4443* (2013.01)

(58) Field of Classification Search
CPC ............................. G06F 3/04883; G06F 3/048
USPC .......................................................... 715/863
See application file for complete search history.

(56) References Cited

U.S. PATENT DOCUMENTS

| 5,875,108 | A | 2/1999 | Hoffberg et al. | |
|---|---|---|---|---|
| 7,365,736 | B2 | 4/2008 | Marvit et al. | |
| 7,796,818 | B2 | 9/2010 | Iwayama et al. | |
| 7,886,236 | B2 | 2/2011 | Kolmykov-Zotov et al. | |
| 8,341,558 | B2 * | 12/2012 | Li | 715/863 |
| 2003/0195567 | A1 * | 10/2003 | Jayne et al. | 607/5 |
| 2006/0095950 | A1 * | 5/2006 | Coonce et al. | 725/108 |
| 2007/0113207 | A1 * | 5/2007 | Gritton | 715/863 |
| 2008/0122796 | A1 * | 5/2008 | Jobs et al. | 345/173 |
| 2009/0278806 | A1 | 11/2009 | Duarte et al. | |
| 2009/0319181 | A1 | 12/2009 | Khosravy et al. | |

(Continued)

FOREIGN PATENT DOCUMENTS

EP 2187300 A1 5/2010

OTHER PUBLICATIONS

Malik, S.; An Exploration of Multi-Finger Interaction on Multi-Touch Surfaces; A thesis submitted in conformity with the requirements for the degree of Doctor of Philosophy, Graduate Department of Computer Science, University of Toronto, 2007.

(Continued)

*Primary Examiner* — William Bashore
*Assistant Examiner* — Rayeez Chowdhury
(74) *Attorney, Agent, or Firm* — Ingrassia Fisher & Lorenz, P.C.

(57) ABSTRACT

Methods and apparatus for determining an intended gesture-based input command from an incomplete gesture-based input command that is supplied to a gesture-based touch screen display that includes at least a touch sensitive region includes receiving an incomplete gesture-based input command on the touch sensitive region of the gesture-based touch screen device, the incomplete gesture-based input command including a gesture profile and a gesture direction. Gesture signals that include data representative of the gesture profile and the gesture direction are generated in response to the input command. The gesture signals are processed in a processor to predict the intended gesture-based input command. The intended gesture-based command is retrieved, with the processor, from an electronically stored standard gesture library.

12 Claims, 5 Drawing Sheets

(56) References Cited

U.S. PATENT DOCUMENTS

| | | | |
|---|---|---|---|
| 2010/0153890 A1 | 6/2010 | Wang et al. | |
| 2011/0141009 A1 | 6/2011 | Izumi | |
| 2011/0187651 A1 | 8/2011 | Whitlow et al. | |
| 2011/0244919 A1 | 10/2011 | Aller et al. | |
| 2011/0289455 A1* | 11/2011 | Reville et al. | 715/830 |
| 2012/0054692 A1* | 3/2012 | Harrison | 715/863 |
| 2012/0081303 A1* | 4/2012 | Cassar et al. | 345/173 |
| 2012/0198353 A1* | 8/2012 | Lee et al. | 715/748 |
| 2012/0322527 A1* | 12/2012 | Aoki et al. | 463/16 |

OTHER PUBLICATIONS

Saponas, T.S.; Supporting Everyday Activities Through Always-Available Mobile Computing; A dissertation submitted in partial fulfillment of the requirements for the degree of Doctor of Philosophy, University of Washington, 2010.

Wang, F., et al.; Simulating A Smartboard by Real-time Gesture Detection in Lecture Videos; IEEE Transactions on Multimedia. Jun. 13, 2008; pp. 1-10. Retrieved from Internet [http://vireo.cs.cityu.edu.hk/LEdit/TMM08-double.pdf].

* cited by examiner

INTELLIGENT GESTURE-BASED USER'S INSTANTANEOUS INTERACTION AND TASK REQUIREMENTS RECOGNITION SYSTEM AND METHOD

TECHNICAL FIELD

The present invention generally relates to gesture-based touch screen user interfaces, and more particularly relates to a gesture-based touch screen user interface that intelligently recognizes instantaneous user interactions with the touch screen user interface.

BACKGROUND

Touch screen display user interfaces that rely on gestural input from users are being used in myriad systems and environments. One of the motivations for using such interfaces is to offer an intuitive short cut to system functionality through physical gestures performed on the touch screen surface. Additionally, a user can invoke a control function from anywhere on the sensitive portion of the touch screen display. Hence, a dedicated button, knob, or other user interface element located in a fixed location or in a menu hierarchy is not required. This increases the total available touch screen area for displaying actual information contents and reducing the time on task.

Although gestural touch screen display user interfaces can be both attractive and intuitive to a user, these interfaces can exhibit certain drawbacks. For example, in an environment where multiple physical and mental tasks may be performed by a user, such as an aircraft pilot, a crane operator, a vehicle driver, or a soldier, a gestural touch screen display user interface can increase physical/cognitive workload, degrade user experience, and/or reduce operational margin and usability of the interface. More specifically, mandatory complete and long gestural interaction with the interface can be more difficult than, for example, a single click of a mouse button or a single tap on a touch screen. This could further add to the physical workload if a user needs to operate a gestural touch screen display user interface repetitively, e.g. multiple pinch in/out gestures for zooming maps, multiple swipe up/down gestures for scrolling a list, etc. When experiencing turbulence, while on rough roads or seas, vehicle operators could face additional difficulty in inputting complete gestures. It is possible that a vehicle operator would be unable to input the correct and complete gesture, thereby degrading the user experience and reducing usability of the gestural touch screen user interface in such unstable conditions. Furthermore, some operators might naturally strive for inputting perfect and complete gesture even in calm situations. This could undesirably increase the head-down time of such operators.

Hence, there is a need for a gestural touch screen display user interface that does not rely on mandatory complete and long gestural interactions for implementing a control function. The present invention addresses at least this need.

BRIEF SUMMARY

In one embodiment, a method for determining an intended gesture-based input command from an incomplete gesture-based input command that is supplied to a gesture-based touch screen display that includes at least a touch sensitive region includes receiving an incomplete gesture-based input command on the touch sensitive region of the gesture-based touch screen device, the incomplete gesture-based input command including a gesture profile and a gesture direction. Gesture signals that include data representative of the gesture profile and the gesture direction are generated in response to the input command. The gesture signals are processed in a processor to predict the intended gesture-based input command. The intended gesture-based command is retrieved, with the processor, from an electronically stored standard gesture library.

In another embodiment, a gesture-based touch screen display system includes a touch screen display and a processor. The touch screen display includes at least a touch sensitive region that is adapted to receive incomplete gesture-based input commands from a user. The touch sensitive region is configured, upon receipt of the incomplete gesture-based input commands, to generate gesture signals that include data representative of a gesture profile and a gesture direction. The processor is coupled to receive the gesture signals and is configured, upon receipt thereof, to predict an intended gesture-based input command and retrieve the intended gesture-based command from an electronically stored standard gesture library.

Furthermore, other desirable features and characteristics of the gesture-based touch screen user interface system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 2(*a*)-(*c*) depict representations of the use of an instantaneous gesture profile extrapolation methodology;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
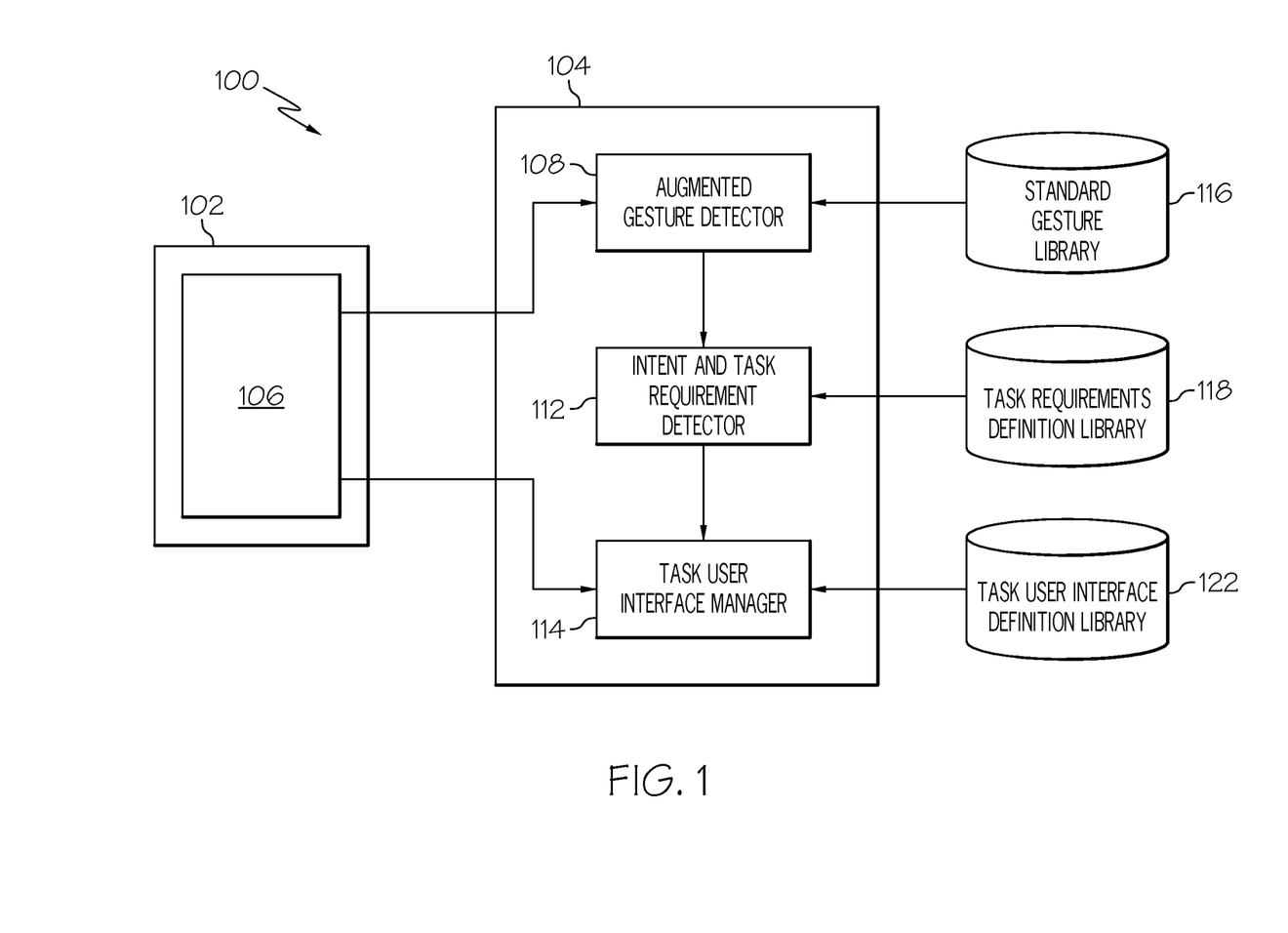
FIG. 1 depicts a functional block diagram of one embodiment of a touch screen user interface system.

A block diagram of one embodiment of a gesture-based touch screen display system 100 is depicted in FIG. 1 and includes a touch screen display 102 and a processor 104. The touch screen display 102 includes at least a touch sensitive region 106 that is adapted to receive gesture-based input commands from a non-illustrated user and is configured, upon receipt thereof, to generate real-time gesture signals representative of the gesture-based input commands. As is generally known, gesture-based input commands, are commands that a user inputs to a touch sensitive region of a display using one or more fingers. For example, a pinch-in gesture using two fingers (either on the same hand or on different hands) may correspond to a "zoom" command. As may be readily appreciated, the real-time gesture signals that the touch sensitive region 106 generates include data representative of both a gesture profile and a gesture direction. It will be appreciated that the touch screen display 102 may be implemented using any one of numerous touch screen displays configured to receive continuous touches from a user that correspond to various gesture-based input commands.

As was previously noted, a user may, in certain situations, input an incomplete and/or inexact gesture command to the touch sensitive region 106. As may thus be appreciated, when this occurs the real-time gesture signals that the touch sensitive region 106 generates will be representative of the incomplete gesture command. It should be noted that the term "incomplete gesture," as used herein, encompasses both incomplete gestures and inaccurate gestures. Whether the gesture-based input commands supplied to the touch sensitive region 106 are complete gesture commands or incomplete gesture commands, the real-time gesture signals that result therefrom are supplied to the processor 104.

The processor 104 is coupled to receive the real-time gesture signals generated by the touch screen display 102 and is configured, upon receipt thereof, to supply various signals that will, among other things, cause the system 100 to implement a command representative of the gesture-based input commands. When the gesture-based input commands are complete and sufficiently accurate, the processor 104 may implement this functionality using any one of numerous processes that are generally known in the art. These known processes will not be described further herein. When, however, the gesture-based input commands are incomplete, the processor 104, implementing additional functionality that will now be described, predicts the user's intended gesture-based input command, and retrieves the intended gesture-based command from an electronically stored standard gesture library.

To carry out the additional functionality described above, the processor 104 is further configured to implement an augmented gesture detector 108, an intent and task requirement detector 112, and a task user interface manager 114. The augmented gesture detector 108 receives the real-time gesture signals supplied by the touch screen display 102. As has been repeatedly noted, the environment, the user, or the combination of both may result in the user inputting incomplete gesture commands on the touch sensitive region 106, and thus the touch screen display 102 supplying real-time gesture signals representative of incomplete gesture commands. The augmented gesture detector 108, in response to the real-time gesture signals, predicts the intended gesture-based input command (e.g., what the complete gesture-based input command would have been), and retrieves a corresponding complete gesture-based command from a standard gesture library 116.

The standard gesture library 116 electronically stores a plurality of templates representative of standard gesture-based commands. The specific type and number of standard gesture-based commands may vary, and may be selected from any one of numerous known gesture libraries, a gesture library that is unique to the system 100, or a combination of both. It will be appreciated that although the standard gesture library 116 is, for clarity and convenience, depicted as being implemented in a storage structure that is separate from the processor 104, all or portions of the standard gesture library 116 could be integrally formed as part of the processor 104. The standard gesture library 116 could also be part of a device or system that is physically separate from the display system 100.

Figure 2A:
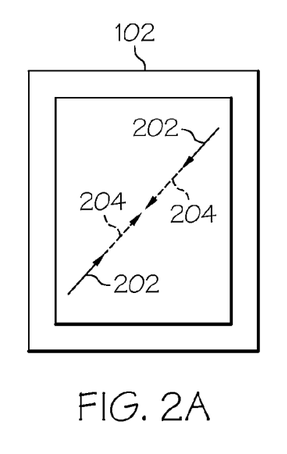
Figure 2B:
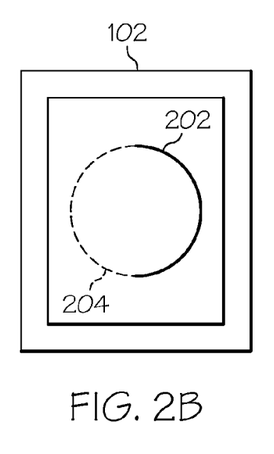
Figure 2C:
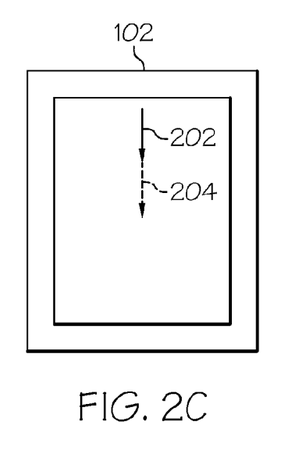

The manner in which the augmented gesture detector 108 predicts the intended gesture-based input command may be variously implemented. One method that the augmented gesture detector 108 implements in making this prediction is referred to herein as "instantaneous gesture profile extrapolation." With this method, which is illustrated in FIGS. 2(*a*)-(*c*), the real-time gesture signals (profiles and directions) 202 are extrapolated 204 and compared with the complete standard gesture-based commands that are electronically stored in the standard gesture library 116. If the extrapolated gesture matches any of the complete standard gesture-based commands, the matching complete standard gesture-based command is determined to be the intended gesture-based input command and is retrieved from the standard gesture library 116 for further processing.

Figure 3:
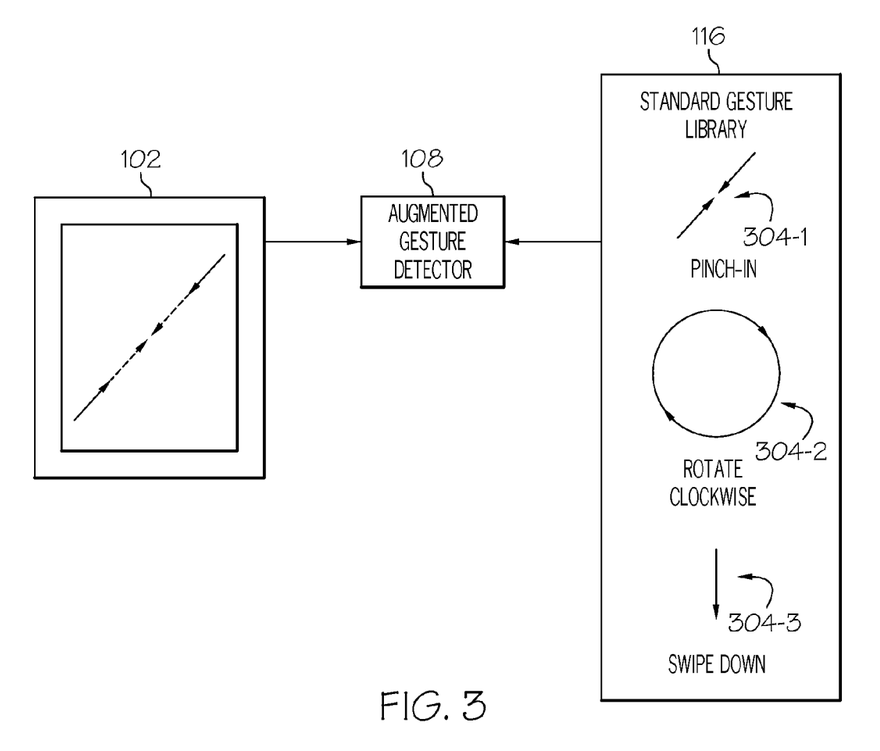
FIG. 3 depicts a representation of the use of an enhanced partial gesture fitting methodology.

Another method that the augmented gesture detector 108 may implement is depicted more clearly in FIG. 3, and is referred to herein as "enhanced partial gesture fitting." With this method, the real-time gesture signals (profiles and the directions) 302 are compared to appropriate or symmetrical portions (as is case with the depicted Pinch-In gesture) of the complete standard gesture-based commands 304 (e.g., 304-1, 304-2, 304-3) that are electronically stored in the standard gesture library 116. If there is a match to any of the complete standard gesture-based commands, the matching complete standard gesture-based command is determined to be the intended gesture-based input command and is retrieved from the standard gesture library 116 for further processing.

No matter the specific method that the augmented gesture detector 108 implements to predict the intended gesture-based input command, the complete standard gesture-based command is transmitted to the intent and task requirement detector 112. The intent and task requirement detector 112 is configured, upon receipt of the complete standard gesture-based command, to retrieve one or more task requirements that are electronically stored in a task requirements definition library 118. The intent and task requirement detector 112 then supplies task requirement commands to the task user interface manager 114.

More specifically, the complete standard gesture-based command that is supplied by the augmented gesture detector 108 may correspond not only to a user's instantaneous task requirements, but to a user's optional related tasks. For example, if the augmented gesture detector 108 determines that the complete standard gesture-based command is a "Pinch-In" gesture-based command, then the user's instantaneous task requirement is to zoom-in/out on the contents displayed on the touch screen display 102. Moreover, the user's optional related task requirements may include, for example, "Pan," "Precision Zoom," etc.

Figure 4:
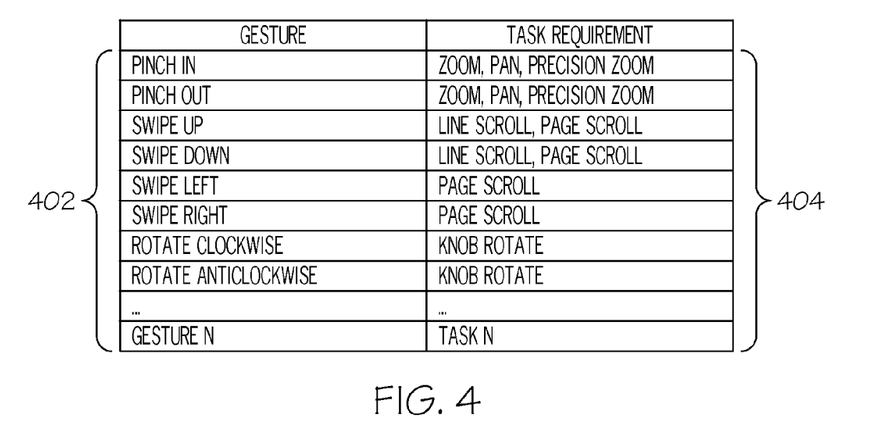
FIG. 4 depicts a table representative of an exemplary embodiment of at least a portion of a task requirements definition library.

The task requirements definition library 118 electronically stores data that maps complete standard gesture-based commands to one or more user interface tasks. One exemplary embodiment of at least a portion of the data that are stored in the task requirements definition library 118 is depicted in FIG. 4 in tabular form and includes standard gesture-based commands 402 and associated task requirement identifiers 404. The task requirement identifiers 404, as alluded to above, may include not only an instantaneous task requirement identifier, but one or more related task requirement identifiers. As with the standard gesture library 116, it will be appreciated that the task requirements definition library 118 is depicted, for clarity and convenience, as being implemented in a storage structure that is separate from the processor 104. However, all or portions of the task requirements definition library 118 could be integrally formed as part of the processor 104, or it could be part of a device or system that is physically separate from the display system 100.

The task user interface manager 114 receives the task requirement commands from the intent and task requirement detector 112. The task user interface manager 114 is configured, in response to the received task requirements commands, to retrieve image data from a task user interface definition library 122, and command the touch screen 102 to render one or more images (e.g., graphical user interface components) representative of the retrieved image data. The task user interface manager 114 is also configured to route the complete standard gesture-based commands to appropriate, non-illustrated circuits and/or devices, which will implement the commands. As will be described further below, the task user interface manager 114 is additionally configured to selectively command the touch screen 102 to cease rendering the one or more images (e.g., graphical user interface components) representative of the retrieved image data.

Figure 5:
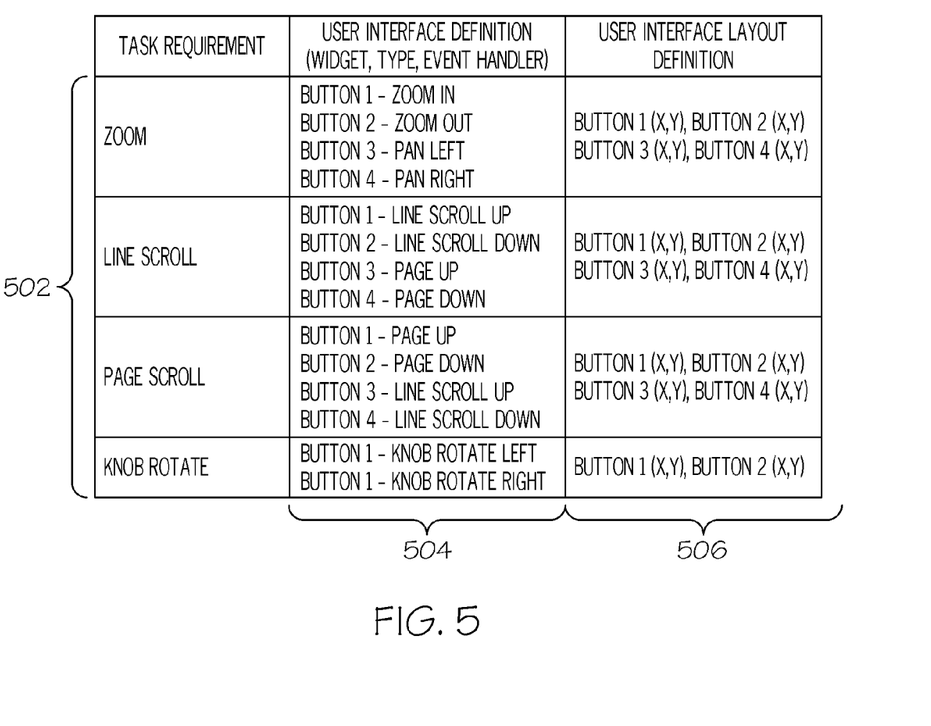
FIG. 5 depicts a table representative of an exemplary embodiment of at least a portion of a task user interface definition library.

The task user interface definition library 122 electronically stores data that are used by the user interface task manager 114 to instantiate the corresponding one or more graphical user interface components. One example of at least a portion of the data that are stored in the task user interface definition library 122 is depicted in FIG. 5 in tabular form. In the depicted embodiment, the data stored in the task user interface definition library 122 maps a task requirement 502 to a user interface definition 504 and to a user interface layout definition 506. Each user interface definition 504 includes a collection of graphical user interface elements (e.g., widgets) and the associated control functions, and each user interface layout definition 506 defines the location of the associated graphical user interface elements on the touch screen display 102. Though not depicted in FIG. 5, the data stored in the task user interface definition library 122 may also include information regarding the amount of time a graphical user interface component should be rendered on the touch screen display 102 before the task user interface manager 114 commands the touch screen 102 to cease rendering the graphical user interface component.

Having described the overall configuration of the gesture-based touch screen display system 100, and the functions of the various elements that comprise the system 100, an embodiment of the processes that the system 100 may be configured to implement will now be described. In doing so, reference should be made to FIG. 6, which depicts an embodiment of the general process 600, in flowchart form, that the system 100 is configured to implement. As may be seen, the process 600 begins when a user supplies an incomplete gesture-based input command to the touch sensitive region 106 of the touch screen display 102 (602). The processor 104, implementing the augmented gesture detector 108, predicts the intended gesture-based input command (604). If the intended gesture-based input command is in the standard gesture library 116, the complete gesture-based command is retrieved and passed on to the intent and task requirement detector 112 (606). If not, the process 600 awaits further input from a user.

Figure 6:
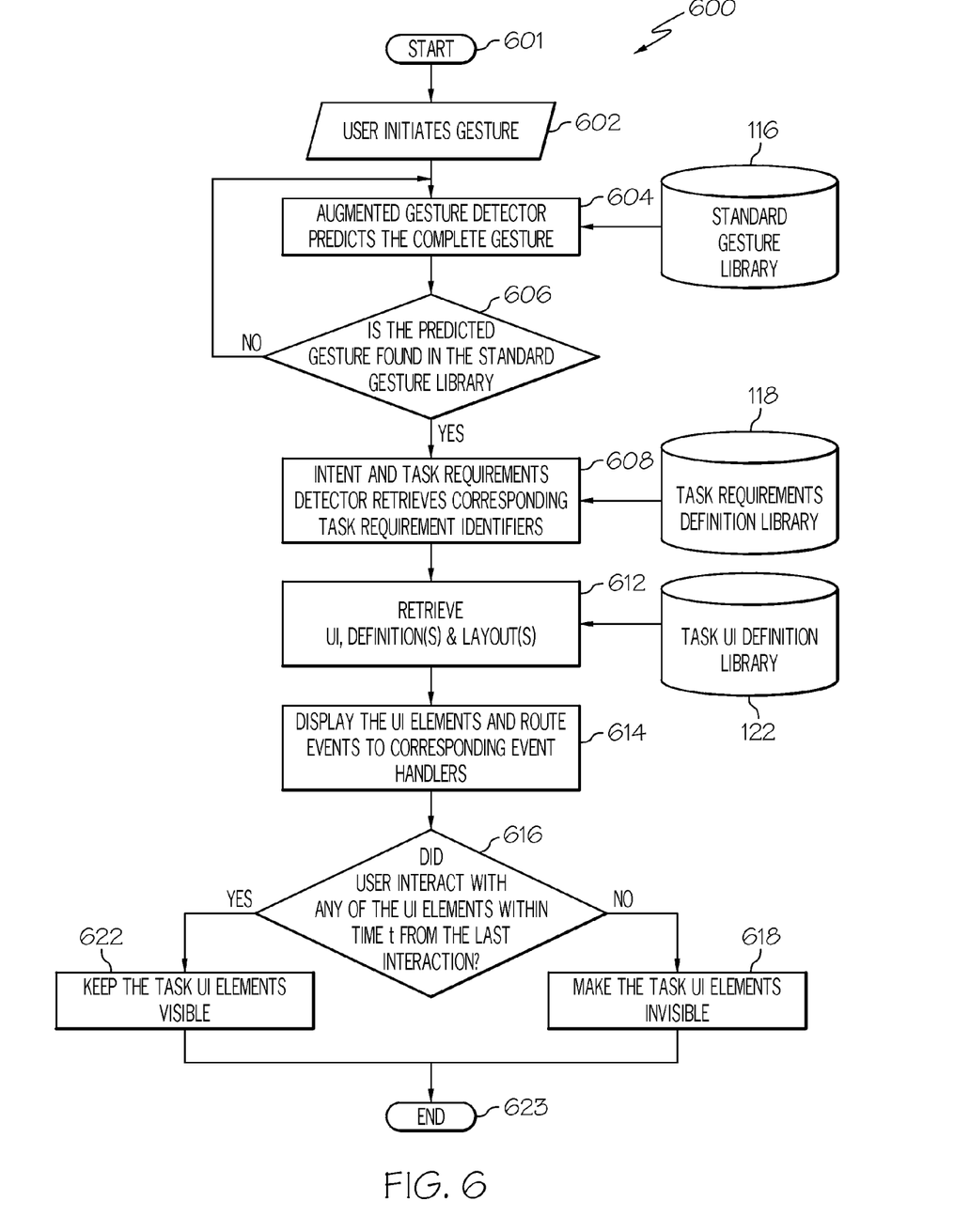
FIG. 6 depicts exemplary process, in flowchart form, that the system of FIG. 1 may implement.

The intent and task requirement detector 112, based upon the complete gesture-based command, retrieves the corresponding task requirement identifiers 404 (instantaneous and related, if applicable) from the task requirement definition library 118 (608). The task identifier(s) is(are) supplied on to task user interface manager 114, which retrieves the appropriate user interface definition(s) 502 and user interface layout(s) 504 from the task user interface definition library 122 (612). The task user interface manager 114 commands the touch screen display 102 to render the appropriate user interface element(s) where the user performed the gesture (614).

Figure 7:
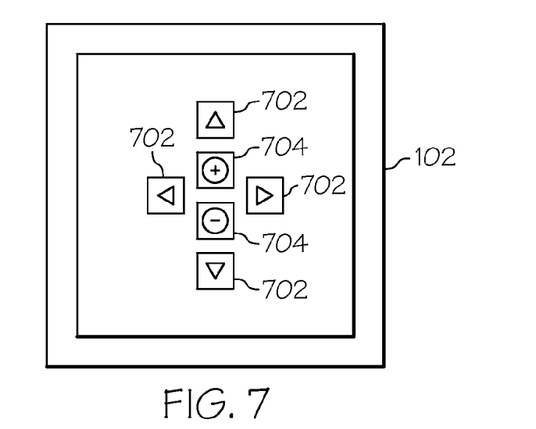
FIGS. 7-9 depict examples of user interface elements that may be rendered by the touch screen user interface system depicted in FIG. 1.
Figure 8:
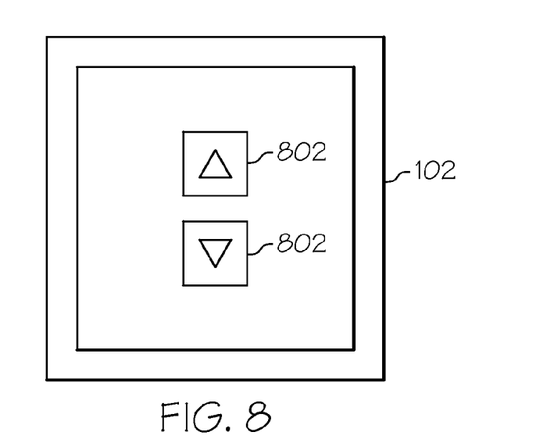
Figure 9:
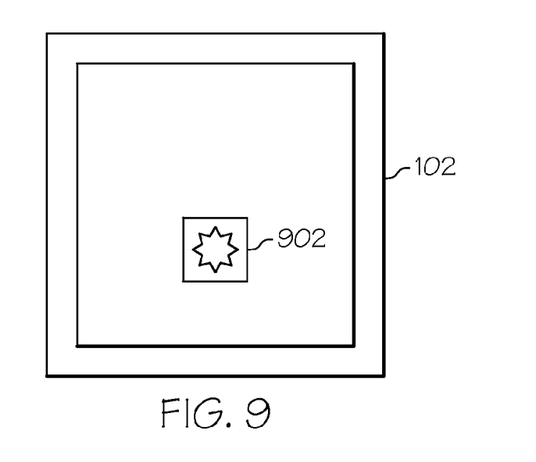

Before proceeding further, some examples of user interface elements that the task user interface manager 114 may command the touch screen display 102 to render are, for completeness, depicted in FIGS. 7-9 and will be briefly described. The user interface elements rendered in FIG. 7 represent an instance in which a user input a "Pinch-In" gesture-based command. As a result, the instantaneous task requirement is to "zoom-in/out" on the contents displayed on the touch screen display 102. The user's related task requirements may include a need to "pan" or to perform a "precision zoom." Thus, in addition to performing the instantaneous "zoom-in/out" task, user interface elements that facilitate panning 702 and that facilitate precision zooming 704 are rendered on the touch screen display 102. The user interface element rendered in FIG. 8 represents an instance in which a user input a "Swipe-Down" or "Swipe-Up" gesture-based command. As a result, the instantaneous task requirement is to "line-scroll" up or down the contents displayed on the touch screen display 102, and the user's related task requirements may include a need to "page-scroll." Thus, in addition to performing the instantaneous "line-scroll" task, a user interface element that facilitates page scrolling 802 is rendered on the touch screen display 102. The user interface element rendered in FIG. 9 represents an instance in which a user input a "Clockwise-Circle" or "Counterclockwise-Circle" gesture-based command. The associated instantaneous task requirement is to "rotate" the contents displayed on the touch screen display 102 in either the clockwise or counterclockwise direction. In the depicted embodiment, there is no additional related task requirement. However, to facilitate additional operations on the displayed content, in addition to performing the instantaneous "rotate" task, one or more user interface elements that facilitates additional related operations 902 are rendered on the touch screen display 102.

Returning once again to FIG. 6, it is seen that the task user interface manager 114 commands the touch screen display 102 to continuously render the user interface elements until one or more predetermined events occur (616-622). The predetermined events may vary, but in the depicted embodiment the predetermined event is that the user does not interact with the user interface elements within a predetermined period of time. The predetermined period of time may be a preset, stored time, or a time that is set by a user. The predetermined event may also include that the user touches outside of the sensitive region 106 of the touch screen display 102. No matter the specific predetermined event, upon the occurrence thereof, the task user interface manager 114 will command the touch screen display 102 to cease rendering the user interface elements (618).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for determining an intended gesture-based input command from an incomplete gesture-based input command that is supplied to a gesture-based touch screen display that includes at least a touch sensitive region, the method comprising the steps of:
   receiving an incomplete gesture-based input command on the touch sensitive region of the gesture-based touch screen device, the incomplete gesture-based input command including a gesture profile and a gesture direction;
   generating gesture signals in response to the input command, the gesture signals including data representative of the gesture profile and the gesture direction;
   processing the gesture signals, in a processor, to predict the intended gesture-based input command;
   retrieving, with the processor, the intended gesture-based command from an electronically stored standard gesture library;
   implementing, with the processor, the intended gesture-based command;
   retrieving, with the processor and based on the intended gesture-based command, one or more task requirements from an electronically stored task requirements library, the one or more task requirements comprising one or more tasks that are related to the intended gesture-based command; and
   continuously rendering, on the touch screen display, one or more graphical user interface elements representative of the one or more tasks that are related to the intended gesture-based command until a user does not interact with the one or more graphical user interface elements within a predetermined time period.

2. The method of claim 1, further comprising:
   selectively retrieving, with the processor, image data representative of the one or more graphical user interface elements from an electronically stored graphical user interface definition library.

3. The method of claim 1, wherein the step of processing the gesture signals, in a processor, to predict the intended gesture-based input command comprises:
   extrapolating the gesture profile and the gesture direction to generate an extrapolated input command; and comparing the extrapolated input command to standard gesture-based commands electronically stored in the standard gesture library.

4. The method of claim 3, further comprising retrieving the intended gesture-based command based on the comparison.

5. The method of claim 1, wherein the step of processing the gesture signals, in a processor, to predict the intended gesture-based input command comprises:

comparing the gesture profile and gesture direction to standard gesture-based commands electronically stored in the standard gesture library.

6. The method of claim 5, further comprising retrieving the intended gesture-based command based on the comparison.

7. A gesture-based touch screen display system, comprising:

a touch screen display including at least a touch sensitive region, the touch sensitive region adapted to receive incomplete gesture-based input commands from a user, the touch sensitive region configured, upon receipt of the incomplete gesture-based input commands, to generate gesture signals that include data representative of a gesture profile and a gesture direction; and a processor coupled to receive the gesture signals and configured, upon receipt thereof, to:
(i) predict an intended gesture-based input command,
(ii) retrieve the intended gesture-based command from an electronically stored standard gesture library,
(iii) implement the intended gesture-based command,
(iv) retrieve, based on the intended gesture-based command, one or more task requirements from an electronically stored task requirements library, the one or more task requirements comprising one or more tasks that are related to the intended gesture-based command, and
(iv) supply image rendering display commands to the touch screen display that cause the touch screen display to continuously render one or more graphical user interface elements representative of at least a portion of the one or more task requirements until a user does not interact with the one or more graphical user interface elements within a predetermined time period.

8. The system of claim 7, wherein the processor is further configured to selectively retrieve image data representative of the one or more graphical user interface elements from an electronically stored graphical user interface definition library.

9. The system of claim 7, wherein the processor is configured to predict the intended gesture-based input command by:

extrapolating the gesture profile and the gesture direction to generate an extrapolated input command; and comparing the extrapolated input command to standard gesture-based commands electronically stored in the standard gesture library.

10. The system of claim 9, wherein the processor is further configured to retrieve the intended gesture-based command based on the comparison.

11. The system of claim 7, wherein the processor is configured to predict the intended gesture-based input command by:

comparing the gesture profile and gesture direction to standard gesture-based commands electronically stored in the standard gesture library.

12. The system of claim 11, wherein the processor is further configured to retrieve the intended gesture-based command based on the comparison.

* * * * *